(12) United States Patent
Rhee et al.

(10) Patent No.: US 12,391,096 B2
(45) Date of Patent: Aug. 19, 2025

(54) INTEGRATED COOLING MODULE

(71) Applicant: Hanon Systems, Daejeon (KR)

(72) Inventors: Sangyong Rhee, Daejeon (KR);
In-Guk Hwang, Daejeon (KR); Sang Ok Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 52 days.

(21) Appl. No.: 18/267,881

(22) PCT Filed: May 19, 2022

(86) PCT No.: PCT/KR2022/007185
§ 371 (c)(1),
(2) Date: Jun. 16, 2023

(87) PCT Pub. No.: WO2022/245155
PCT Pub. Date: Nov. 24, 2022

(65) Prior Publication Data
US 2024/0034126 A1 Feb. 1, 2024

(30) Foreign Application Priority Data

May 21, 2021 (KR) .................. 10-2021-0065194

(51) Int. Cl.
*B60H 1/32* (2006.01)
*B60H 1/00* (2006.01)
(Continued)

(52) U.S. Cl.
CPC ....... *B60H 1/3227* (2013.01); *B60H 1/00571* (2013.01); *F01P 3/18* (2013.01); *F25B 41/40* (2021.01); *F25B 43/006* (2013.01)

(58) Field of Classification Search
CPC B60H 1/00571; B60H 1/3227; B60H 1/3229; F25B 41/40; F25B 41/42; F25B 43/006
See application file for complete search history.

(56) References Cited

U.S. PATENT DOCUMENTS 11,440,376 B2 * 9/2022 Calderone ............... F25B 41/40
11,453,267 B2 * 9/2022 Koberstein ........ B60H 1/00907
(Continued)

FOREIGN PATENT DOCUMENTS

JP 2019533797 A 11/2019
KR 20190061821 A 6/2019
(Continued)

OTHER PUBLICATIONS

International Search Report issued in PCT/KR2022/007185 on Aug. 22, 2022.

*Primary Examiner* — Christopher R Zerphey
(74) *Attorney, Agent, or Firm* — NORTON ROSE FULBRIGHT US LLP (57) ABSTRACT

The present invention relates to an integrated cooling module including a central manifold having a mounting space in which components may be mounted, refrigerant flow channels in which a refrigerant may flow, and communication holes for allowing the components and the refrigerant flow channels to communicate with one another, such that the components are integrated around the central manifold, thereof excluding hoses or pipes and achieving miniaturization and weight reduction of an entire cooling system.

15 Claims, 9 Drawing Sheets

(51) Int. Cl.
  *F01P 3/18*   (2006.01)
  *F25B 41/40*  (2021.01)
  *F25B 43/00*  (2006.01)

(56) References Cited

U.S. PATENT DOCUMENTS

| | | | | |
|---|---|---|---|---|
| 2002/0078702 | A1* | 6/2002 | Makizono | F28D 7/04 |
| | | | | 62/271 |
| 2007/0261433 | A1* | 11/2007 | Mikita | F25B 40/00 |
| | | | | 62/503 |
| 2009/0205359 | A1* | 8/2009 | Major | B60H 1/3227 |
| | | | | 62/509 |
| 2010/0071639 | A1* | 3/2010 | Wegner | F02B 37/013 |
| | | | | 123/563 |
| 2018/0231282 | A1* | 8/2018 | Meldrum | F25B 41/40 |
| 2019/0039440 | A1 | 2/2019 | Calderone | |
| 2022/0194167 | A1* | 6/2022 | Morimoto | B60H 1/00571 |
| 2023/0141796 | A1* | 5/2023 | Lee | B60H 1/00342 |
| | | | | 62/113 |
| 2024/0017588 | A1* | 1/2024 | Li | F25B 25/005 |
| 2024/0157759 | A1* | 5/2024 | Jiang | F25B 41/20 |
| 2025/0010685 | A1* | 1/2025 | Kwak | B60H 1/3228 |
| 2025/0058605 | A1* | 2/2025 | Woo | B60H 1/32281 |

FOREIGN PATENT DOCUMENTS

| | | |
|---|---|---|
| KR | 20190068125 A | 6/2019 |
| KR | 20210010121 A | 1/2021 |

* cited by examiner

INTEGRATED COOLING MODULE

CROSS REFERENCE TO RELATED APPLICATIONS

This patent application is a national phase under 35 U.S.C. § 371 of International Patent Application No. PCT/KR2022/007185 filed May 19, 2022, which claims the benefit of priority from Korean Patent Application No. 10-2021-0065194 filed May 21, 2021, each of which is hereby incorporated herein by reference in its entirety for all purposes.

TECHNICAL FIELD

The present invention relates to an integrated cooling module applied to a vehicle cooling system, and more specifically, to an integrated cooling module including a central manifold having a mounting space in which components may be mounted, refrigerant flow channels in which a refrigerant may flow, and communication holes for allowing the components and the refrigerant flow channels to communicate with one another, such that the components are integrated around the central manifold, thereof excluding hoses or pipes and achieving miniaturization and weight reduction of an entire cooling system.

BACKGROUND ART

Recently, as there is gradually increasing interest in energy efficiency and problems of environmental pollution, there is a need for development of environmental-friendly vehicles that can substantially replace internal combustion engine vehicles. The environmental-friendly vehicles are typically classified into an electric vehicle which operates by using fuel cells or electricity as a power source, and a hybrid vehicle that operates by using an engine and a battery.

Unlike an air conditioning device for a general vehicle, a separate heater is not used for an electric vehicle or a hybrid vehicle among the environmental-friendly vehicles. The air conditioning system applied to the environmental-friendly vehicle typically refers to a heat pump system.

Meanwhile, the electric vehicle generates driving power by converting energy, which is generated by a chemical reaction between oxygen and hydrogen, into electrical energy. In this process, because thermal energy is generated by a chemical reaction in a fuel cell, it is essential to effectively remove generated heat to ensure performance of the fuel cell.

Further, the hybrid vehicle also generates driving power by operating an engine that uses general fuel to operate and operating a motor by using electric power supplied from the fuel cell or an electric battery. Therefore, to ensure performance of the motor, it is necessary to effectively remove heat generated from the fuel cell or battery and the motor.

Therefore, in the hybrid vehicle or the electric vehicle in the related art, a battery cooling system needs to be configured as a separate closed circuit, together with a cooling system and a heat pump system, in order to prevent heat generation by the motor, the electrical components, the fuel cell, and the battery.

For this reason, there are problems in that a size and weight of a cooling module disposed at a front side of a vehicle are increased, and layouts of connection pipes for supplying a refrigerant or coolant to a heat pump system, a cooling means, and a battery cooling system in an engine room are complicated.

DOCUMENT OF RELATED ART

Korean Patent Application Laid-Open No. 2019-0068125 (Jun. 18, 2019)

DISCLOSURE

Technical Problem

The present invention has been made in an effort to solve the above-mentioned problems, and an object of the present invention is to provide an integrated cooling module including a central manifold having a mounting space in which components may be mounted, refrigerant flow channels in which a refrigerant may flow, and communication holes for allowing the components and the refrigerant flow channels to communicate with one another, such that the components are integrated around the central manifold, thereof excluding hoses or pipes and achieving miniaturization and weight reduction of an entire cooling system.

Technical Solution

An integrated cooling module according to an example of the present invention may include: a central manifold having a mounting space in which components are mounted, a plurality of refrigerant flow channels in which a refrigerant flows, and communication holes for allowing the components and the refrigerant flow channels to communicate with one another; and the components mounted on the central manifold and configured to communicate with at least one of the plurality of refrigerant flow channels, in which the central manifold defines a cooling circulation circuit by connecting the components.

The plurality of refrigerant flow channels may include refrigerant flow channels in which pressures of the refrigerant flowing therein are different.

The refrigerant flow channels in which pressures of the refrigerant flowing therein are different may be formed at different heights.

The plurality of refrigerant flow channels may include: one or more upper channels formed at an inner upper side of the central manifold; and one or more lower channels formed at an inner lower side of the central manifold and formed below the upper channel.

Pressure of the refrigerant flowing in the upper channel may be higher than pressure of the refrigerant flowing in the lower channel.

A temperature of the refrigerant flowing in the upper channel may be higher than a temperature of the refrigerant flowing in the lower channel.

The upper channel may have a smaller internal cross-sectional area than the lower channel or a larger internal cross-sectional area than the lower channel.

An accumulator assembling structure may be provided at one end of the central manifold based on a longitudinal direction, and an accumulator may be provided at one end of the central manifold based on the longitudinal direction by the accumulator assembling structure.

The accumulator assembling structure may be formed in a hollow ring shape.

The accumulator may include an upper accumulator and a lower accumulator, the upper accumulator may be provided on an upper portion of the accumulator assembling structure and tightly assembled with the accumulator assembling structure, and the lower accumulator may be provided on a lower portion of the accumulator assembling structure and tightly assembled with the accumulator assembling structure.

The accumulator assembling structure may be integrated with the central manifold.

A condenser may be mounted at one side of an upper portion of the central manifold based on the longitudinal direction, an expansion valve may be mounted at the other side of the upper portion of the central manifold, and a chiller may be mounted on a lower portion of the central manifold.

The plurality of refrigerant flow channels may include: a first channel configured to connect the condenser and the accumulator; a second channel configured to connect the accumulator and the expansion valve; a third channel configured to connect the expansion valve and the chiller; and a fourth channel configured to connect the chiller and the accumulator.

The first channel and the second channel may be formed above the third channel and the fourth channel.

The first channel and the second channel may each have a smaller internal cross-sectional area than each of the third channel and the fourth channel.

In the cooling circulation circuit, a high-temperature, high-pressure refrigerant may be introduced into the condenser from the outside and discharged as a high-temperature, high-pressure liquid refrigerant, the high-temperature, high-pressure liquid refrigerant discharged from the condenser may be introduced into the accumulator through the first channel and discharged again, the high-temperature, high-pressure liquid refrigerant discharged from the accumulator may be introduced into the expansion valve through the second channel and discharged as a low-temperature, low-pressure liquid refrigerant, the low-temperature, low-pressure liquid refrigerant discharged from the expansion valve may be introduced into the chiller through the third channel and discharged as a low-temperature, low-pressure gaseous refrigerant, the low-temperature, low-pressure gaseous refrigerant discharged from the chiller may be introduced into the accumulator through the fourth channel and discharged again, and the low-temperature, low-pressure gaseous refrigerant discharged from the accumulator may be discharged to the outside.

One or more PT sensors connected to the refrigerant flow channel may be provided on at least one of front and rear surfaces of the central manifold.

The central manifold may have mounting bosses provided in at least some of the communication holes, and the mounting bosses may extend and protrude to the outside from at least some of the communication holes.

The central manifold may be formed in a long plate shape having a predetermined thickness.

Advantageous Effects

According to the present invention, the components, which constitute the cooling system, may be integrated around the central manifold, and hoses or pipes may be eliminated, thereby achieving miniaturization and weight reduction of the entire cooling system.

In addition, the mounting structure for mounting the components in the vehicle may be eliminated, thereby reducing the number of components and the number of assembling processes at the time of configuring the cooling system.

EXPLANATION OF REFERENCE NUMERALS AND SYMBOLS

10: Integrated cooling module
100: Central manifold
110: Refrigerant flow channel
111, 112, 113, 114: First, second, third, and fourth channels
120: Communication hole
150: Mounting boss
190: Accumulator assembling structure
200: Component
ACCU: Accumulator
IHX: Intermediate heat exchanger
COND: Condenser
EXV: Expansion valve
Chiller: Chiller
PT Sensor: PT sensor

BEST MODE

Hereinafter, the present invention will be described with reference to the accompanying drawings.

Figure 1:
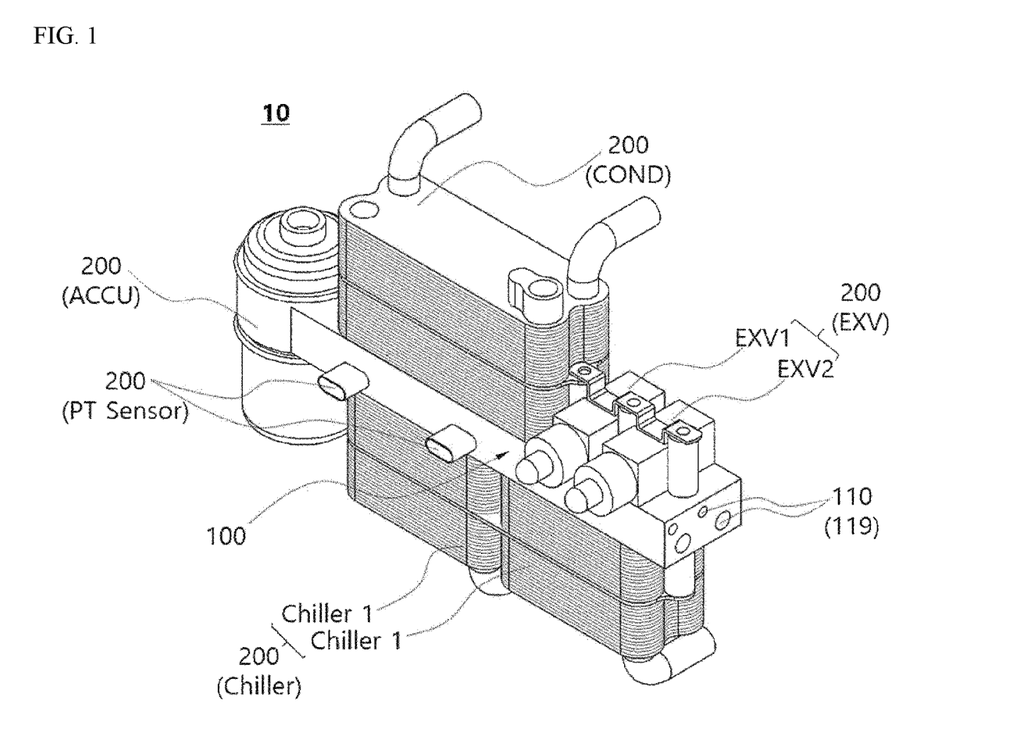
FIG. 1 is a front perspective view of an integrated cooling module according to an example of the present invention.
Figure 2:
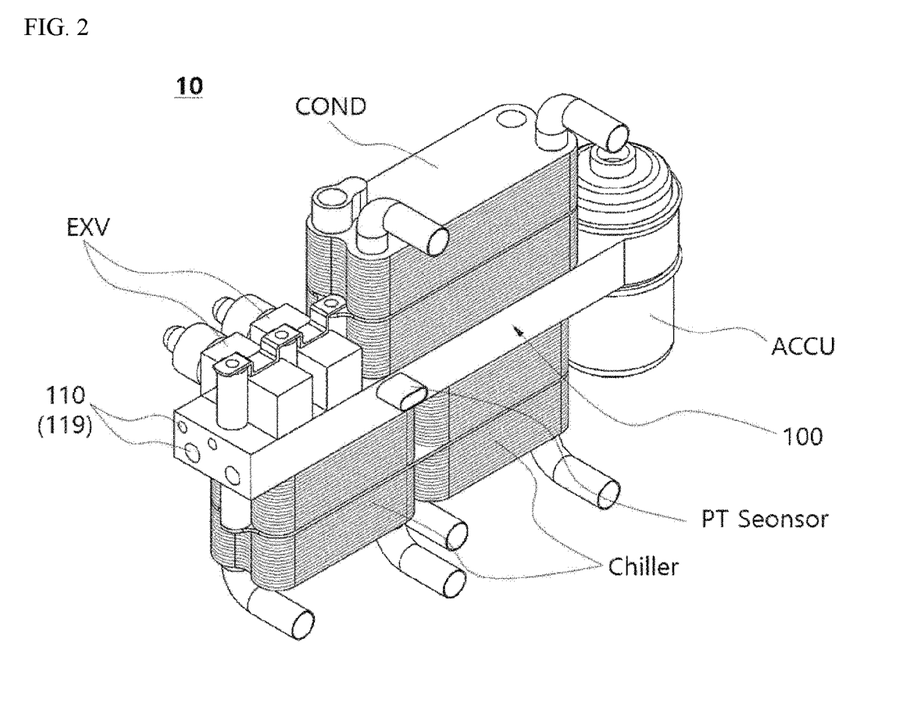
FIG. 2 is a rear perspective view of FIG. 1.
Figure 3:
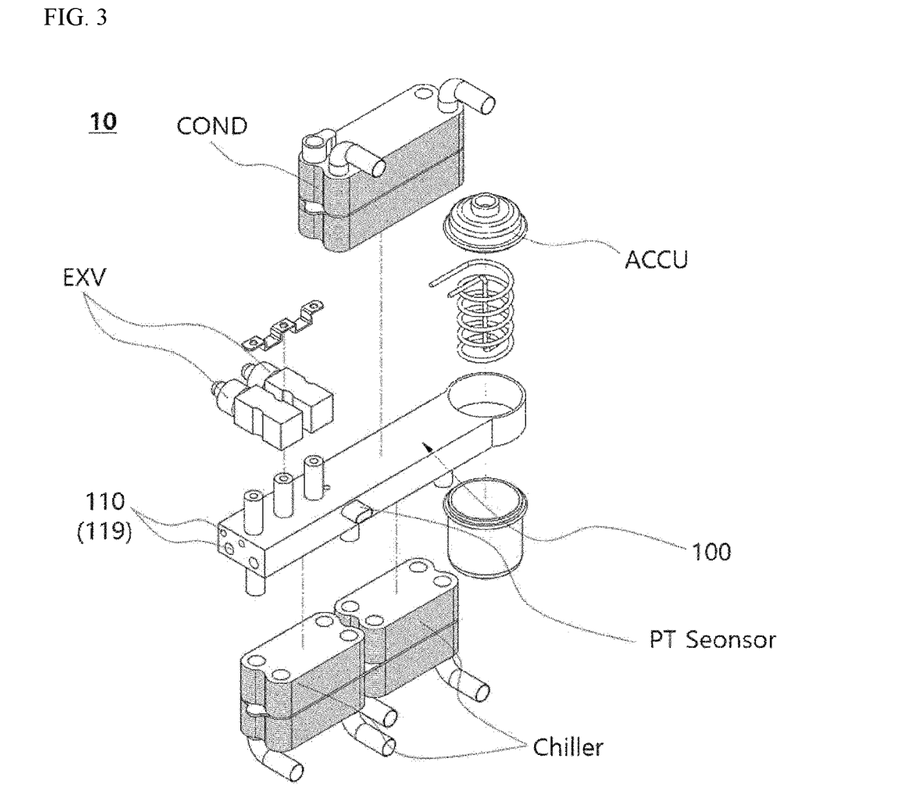
FIG. 3 is an exploded perspective view of FIG. 2.

FIG. 1 is a front perspective view of an integrated cooling module according to an example of the present invention, FIG. 2 is a rear perspective view of FIG. 1, and FIG. 3 is an exploded perspective view of FIG. 2. An integrated cooling module 10 of the present invention broadly includes a central manifold 100 and a plurality of components 200 mounted on the central manifold.

The present invention relates to the integrated cooling module 10 in which the components 200 are integrated around the central manifold 100. The central manifold 100 has a mounting space in which the plurality of components 200 may be mounted, a plurality of refrigerant flow channels 110 in which a refrigerant may flow, and a plurality of communication holes 120 for allowing the components 200, which are mounted on the central manifold, and the refrigerant flow channels to communicate with one another.

The components 200 are constituent elements of a vehicle cooling system. In the present invention, the components 200 may be one or more constituent elements selected from an accumulator ACCU, a condenser COND, an expansion valve EXV, a chiller (Chiller), and a PT sensor (PT Sensor). The accumulator ACCU is a liquid separator configured to separate a liquid refrigerant and a gaseous refrigerant. The condenser COND is a heat exchanger configured to condense the gaseous refrigerant into the liquid refrigerant. The expansion valve EXV is a valve configured to lower pressure of the liquid refrigerant and vaporize the liquid refrigerant. The chiller (Chiller) is a heat exchanger configured to remove heat from the liquid refrigerant. The PT sensor (pressure/temperature sensor, PT Sensor) is a sensor configured to measure pressure and temperature of the refrigerant.

The components 200 are mounted on the central manifold 100 and constitute the integrated cooling module. In this case, the components 200 is mounted to communicate with at least one of the plurality of refrigerant flow channels 110 formed in the central manifold 100. More specifically, the components 200 are mounted to communicate with the communication holes corresponding to the components among the communication holes 120 formed in the central manifold 100. Finally, the components 200 may communicate with the refrigerant flow channels 110.

Figure 4:
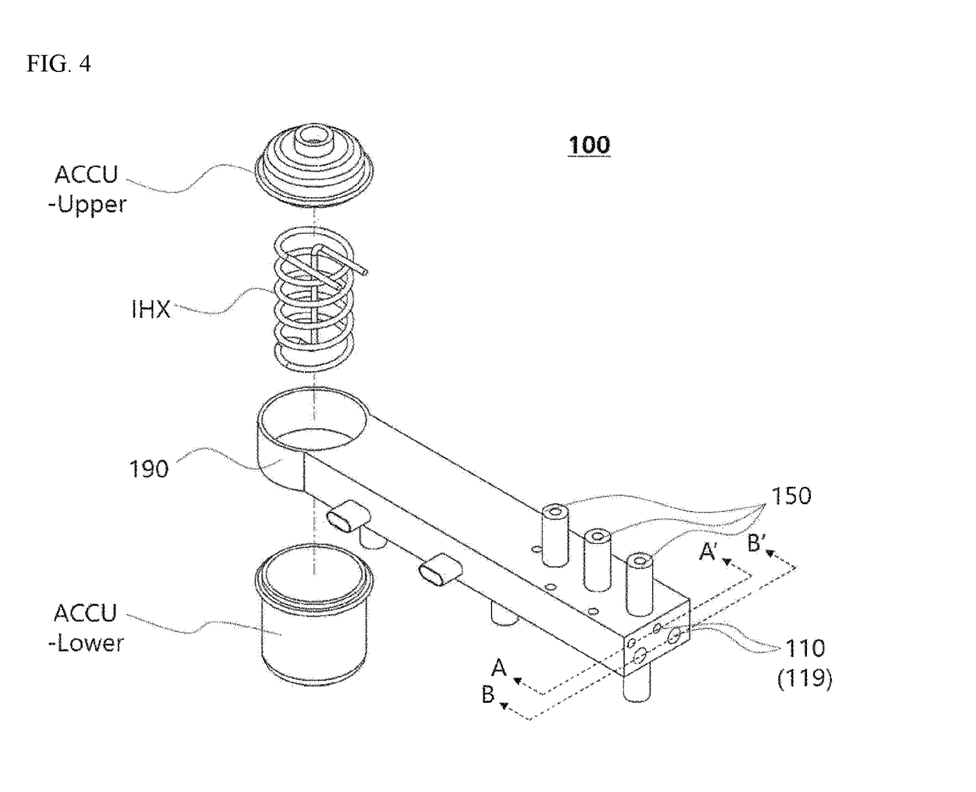
FIG. 4 is an exploded perspective view of a central manifold of the present invention.
Figure 5:
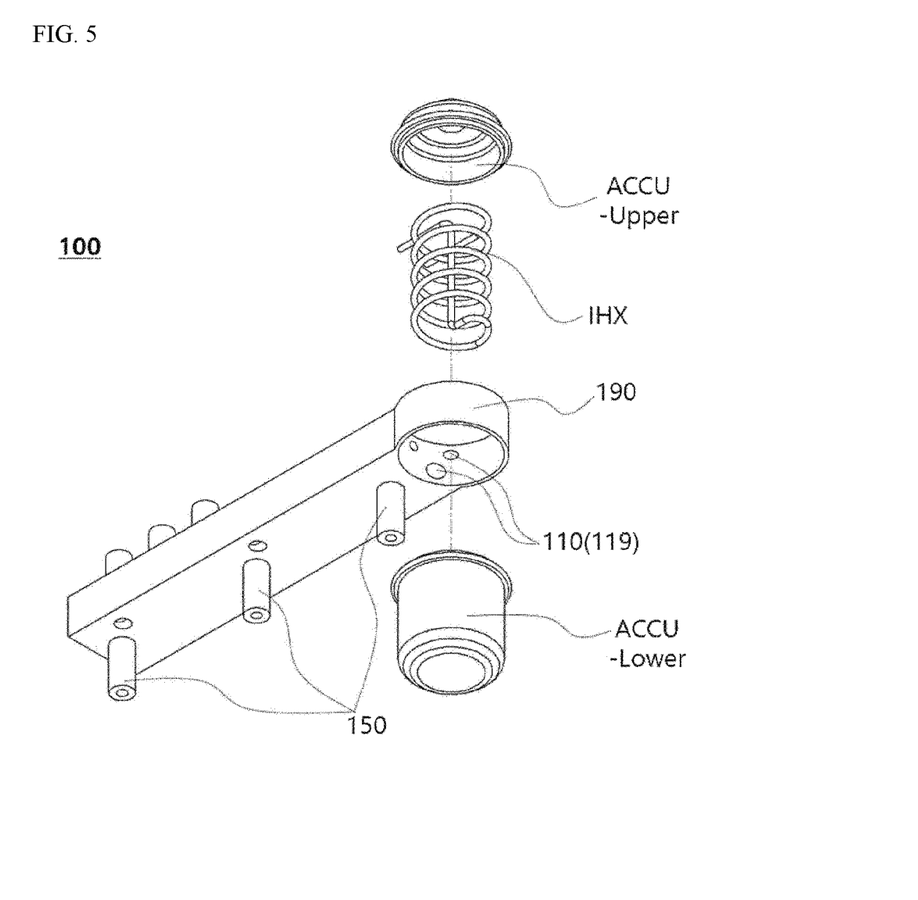
FIG. 5 is an exploded perspective view of FIG. 4 when viewed from below.

FIG. 4 is an exploded perspective view of a central manifold of the present invention, and FIG. 5 is an exploded perspective view of FIG. 4 when viewed from below. As illustrated, the central manifold 100 may have a plurality of mounting bosses 150 extending from the communication holes 120 and protruding to the outside. The components 200 are inserted and mounted into the mounting bosses 150, such that the components 200 and the refrigerant flow channels 110 may communicate with one another. The mounting bosses 150 may be configured as a structure manufactured separately from the central manifold 100 and inserted and sealed into the communication holes 120 formed in the central manifold 100. Alternatively, the mounting bosses 150 may be manufactured integrally with the central manifold 100. The mounting bosses 150, which protrude to the outside as described above, are inserted into the communication portions of the components 200, such that connectivity and coupling force between the components 200 and the central manifold 100 may be improved.

However, in this case, the mounting bosses 150 may not be provided in all the communication holes 120 of the central manifold 100. The mounting boss 150 may not be provided in some of the communication holes 120. This configuration may be selectively designed in accordance with structural features of the components 200 mounted on the central manifold 100. For example, the PT sensor (PT sensor) itself has a detection port. Therefore, the mounting boss 150 may not be provided in the communication hole corresponding to the position at which the PT sensor is mounted.

Hereinafter, a structure for assembling the central manifold and the accumulator of the present invention will be described in more detail with reference to FIGS. 4 and 5.

The central manifold 100 of the present invention may be formed in a long plate shape having a predetermined thickness. Because the central manifold 100 is formed in a plate shape, upper and lower portions of the central manifold 100 are formed to be flat, such that the components are easily mounted on the central manifold 100. Because the central manifold 100 has a predetermined thickness, the refrigerant flow channels may be freely formed in the central manifold 100.

As described above, the flow channel 110, in which the refrigerant flows, may be formed in the central manifold 100. In this case, the refrigerant flow channels may include one or more upper channels formed at an inner upper side of the central manifold, and one or more lower channels formed at an inner lower side of the central manifold. The one or more upper channels may be formed at the same height or different heights. The one or more lower channels may be formed at the same height or different heights. In the present invention, all the upper channels may be formed to be higher than all the lower channels. Further, an internal cross-sectional area of the upper channel may be different from an internal cross-sectional area of the lower channel. That is, the upper channel may be formed to be narrower or wider than the lower channel. The detailed contents related to the upper and lower channels will be described below.

Meanwhile, an accumulator assembling structure 190 may be provided at one end of the central manifold 100 based on a longitudinal direction. Therefore, the accumulator ACCU may be provided at one end of the central manifold 100 based on the longitudinal direction. The accumulator ACCU is a liquid separator for separating a liquid refrigerant and a gaseous refrigerant. The accumulator ACCU of the present invention may have therein an intermediate heat exchanger (tubular IHX) provided in the form of a pipe. The intermediate heat exchanger IHX may be provided in the form of a pipe and structured to be spirally accommodated in the accumulator ACCU. The refrigerant may be divided into the liquid refrigerant and the gaseous refrigerant by heat exchange while flowing along the spiral shape.

In this case, the accumulator assembling structure 190 provided at one side of the central manifold 100 may be formed in a hollow ring shape. That is, as illustrated well in FIGS. 4 and 5, the accumulator assembling structure 190 may be provided at one side of the central manifold 100 based on the longitudinal direction and have a thickness equal to the thickness of the central manifold 100. The accumulator assembling structure 190 may protrude and extend from the central manifold 100 in the longitudinal direction. In this case, the accumulator assembling structure 190 may be configured as a separate structure that is manufactured separately from the central manifold 100 and coupled to the central manifold 100. Alternatively, the accumulator assembling structure 190 may be manufactured integrally with the central manifold 100 and integrated with the central manifold 100.

In this case, the accumulator ACCU includes an upper accumulator ACCU-Upper and a lower accumulator ACCU-Lower. The upper accumulator ACCU-Upper may be provided on an upper portion of the accumulator assembling structure 190 having a ring shape, and the upper accumulator ACCU-Upper may be tightly assembled with the accumulator assembling structure 190. The lower accumulator ACCU-Lower may be provided on a lower portion of the accumulator assembling structure 190 having a ring shape, and the lower accumulator ACCU-Lower may be tightly assembled with the accumulator assembling structure 190. For example, as a method of tightly assembling the accumulator assembling structure and the upper and lower accumulators, a mechanical fastening method such as welding or press-fitting may be used. Alternatively, screw threads may be formed on the accumulator assembling structure and the upper and lower accumulators, and the accumulator assembling structure and the upper and lower accumulators may be assembled by screw-coupling.

As described above, in the case of the accumulator ACCU of the present invention, the accumulator assembling structure 190 may constitute a central portion of a body of the accumulator ACCU, the upper accumulator ACCU-Upper may constitute an upper cap of the body, and the lower accumulator ACCU-Lower may constitute a lower portion and a bottom surface of the body, such that the accumulator ACCU may have a shape sealed therein. In this case, the intermediate heat exchanger IHX having a pipe shape may be accommodated in the sealed interior of the accumulator ACCU.

Hereinafter, a specific embodiment of the integrated cooling module in which the components are mounted on the central manifold will be described.

With reference back to FIGS. 1 and 2, the condenser COND may be mounted at one side of the upper portion of the central manifold 100 based on the longitudinal direction, the expansion valve EXV may be mounted at the other side of the upper portion of the central manifold 100, and the chiller (Chiller) may be mounted on the lower portion of the central manifold 100. The expansion valve EXV may be provided as a plurality of expansion valves EXV1 and EXV2. The condenser COND and/or the chiller (Chiller) may each be a single heat exchanger component or a heat exchanger module including a plurality of heat exchanger components. For example, according to the embodiment of the present invention, the condenser COND may be configured as a single chiller, and the chiller (Chiller) may be a chiller module including a first chiller (Chiller 1) and a second chiller (Chiller 2). Further, one or more PT sensors (PT sensor) connected to the refrigerant flow channels 110 may be provided on at least one of front and rear surfaces of the central manifold 100. As described above, the PT sensor (PT sensor) may be connected to the refrigerant flow channel 110 by being inserted directly into the communication hole 120 formed in the central manifold.

Figure 6:
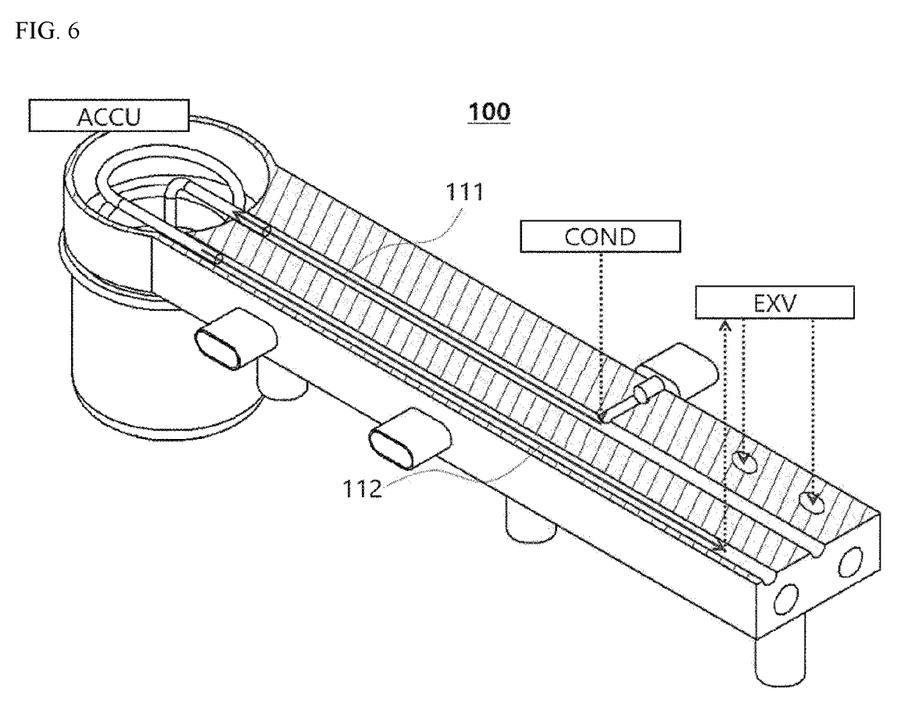
FIGS. 6 and 7 are cross-sectional views of a refrigerant flow channel of the central manifold.
Figure 7:
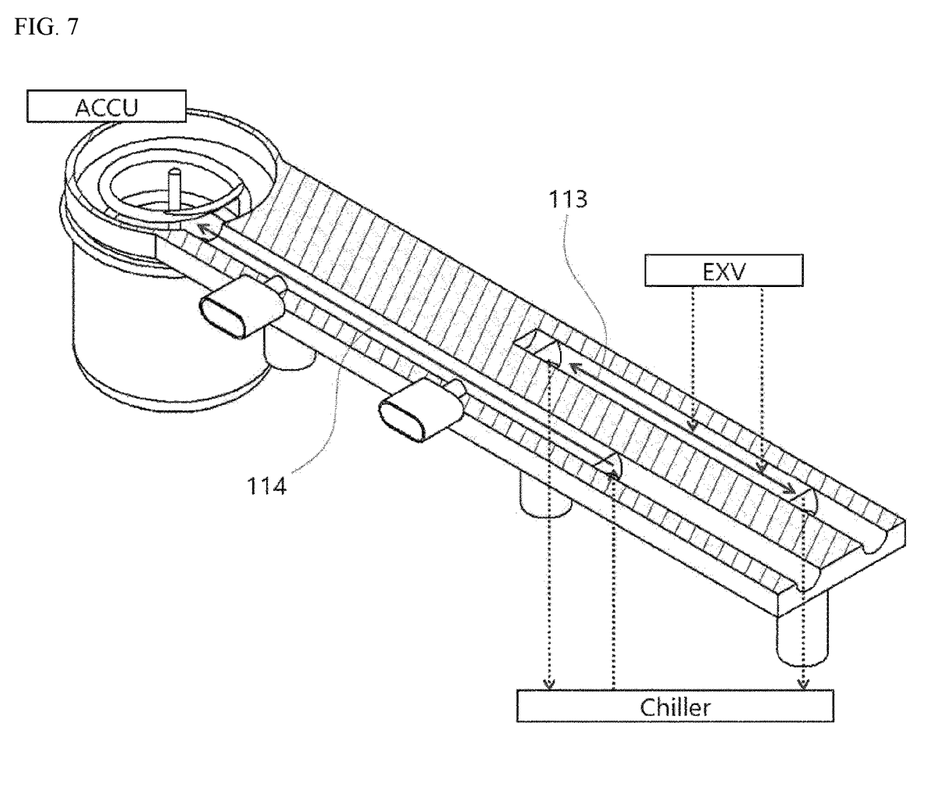

The refrigerant flow channel 110 formed in the central manifold 100 in the specific embodiment in which the components 200 are mounted on the central manifold 100 will be described in detail below. FIGS. 6 and 7 are cross-sectional views of the refrigerant flow channel of the central manifold. FIG. 6 illustrates a cross-section taken along line AA' in FIG. 4, and FIG. 7 illustrates a cross-section taken along line BB' in FIG. 4.

As illustrated in FIG. 6, in the central manifold having a predetermined thickness, the refrigerant flow channels 110 of the present invention may include first and second channels 111 and 112 that are two channels formed at an inner upper side of the central manifold 100. As illustrated in FIG. 7, the refrigerant flow channels 110 may include third and fourth channels 113 and 114 that are additional two channels formed at an inner lower side of the central manifold 100. In the specific connection relationship between the channels 111, 112, 113, and 114 and the components 200, the first channel 111 may connect the condenser COND and the accumulator ACCU, the second channel 112 may connect the accumulator ACCU and the expansion valve EXV, the third channel 113 may connect the expansion valve EXV and the chiller (Chiller), and the fourth channel 114 may connect the chiller (Chiller) and the accumulator ACCU. In addition, the first channel 111 may be connected to one side of the intermediate heat exchanger IHX disposed in the accumulator ACCU. The second channel 112 may be connected to the other side of the intermediate heat exchanger IHX.

In this case, the first channel 111 and the second channel 112 may be formed above the third channel 113 and the fourth channel 114. In addition, the first channel 111 and the second channel 112 may each have a smaller internal cross-sectional area than each of the third channel 113 and the fourth channel 114. In this case, the first channel 111 and the second channel 112 may be the above-mentioned upper channels, and the third channel 113 and the fourth channel 114 may be the above-mentioned lower channel.

As described below, in a cooling circulation circuit of the present invention, the refrigerant flowing through the first and second channels 111 and 112 has a high temperature and high pressure, and the refrigerant passing through the third and fourth channels 113 and 114 has a low temperature and low pressure, such that the first and second channels 111 and 112 are separated from the third and fourth channels 113 and 114 as the upper and lower channels, thereby minimizing the effects on one another. Further, similarly, because the first and second channels 111 and 112 allow the refrigerant to form a high-pressure part and the third and fourth channels 113 and 114 allow the refrigerant to form a low-pressure part, the first and second channels 111 and 112 may be formed to be narrow, and the third and fourth channels 113 and 114 may be formed to be wider than the first and second channels, thereby enabling the refrigerant to flow smoothly in accordance with the states.

Meanwhile, in the central manifold 100 of the present invention, the refrigerant flow channels including the first to fourth channels 111, 112, 113, and 114 may extend to an end of the central manifold, and a channel communication hole 119 may be formed at one end of the central manifold.

Figure 8:
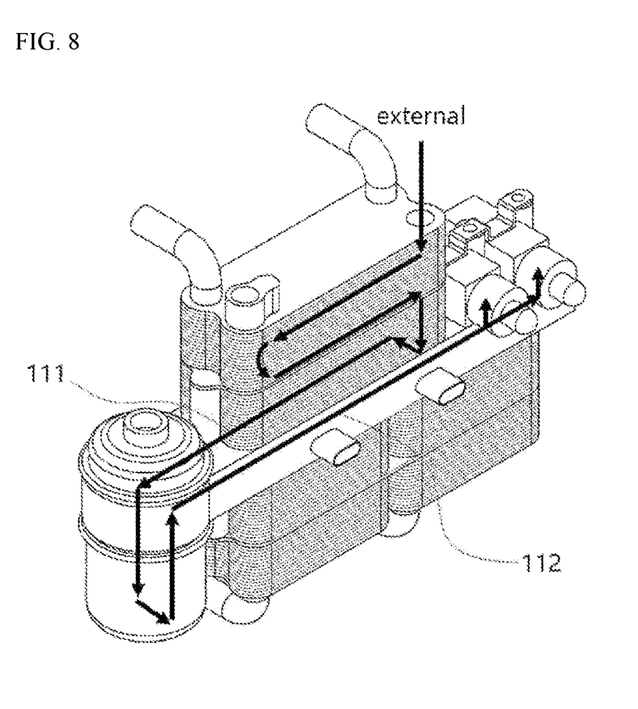
FIGS. 8 and 9 are views illustrating a refrigerant circulation circuit according to the example of the present invention.
Figure 9:
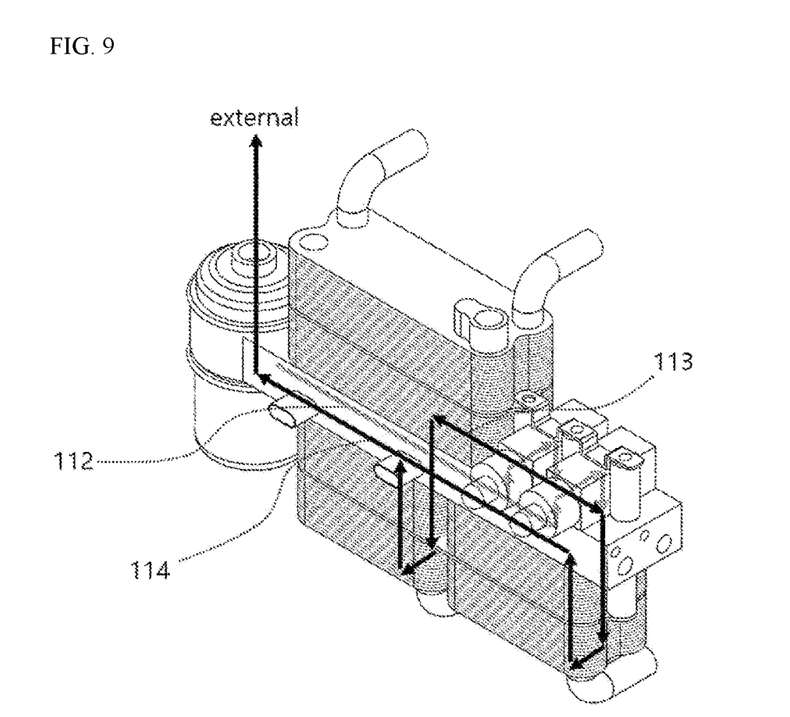

A plug or the like, which closes the channel communication hole 119, may be inserted into the channel communication hole 119, to ensure sealability in the flow path. FIGS. 8 and 9 are views illustrating the refrigerant circulation circuit according to the example of the present invention. The refrigerant circulation circuit of the present invention may be configured as described below. A high-temperature, high-pressure refrigerant may be introduced into the condenser COND from the outside and changed in phase to a high-temperature, high-pressure liquid refrigerant through heat exchange. Thereafter, the high-temperature, high-pressure liquid refrigerant may be discharged from the condenser COND and introduced into the accumulator ACCU through the first channel 111, such that a gaseous refrigerant may be separated. Thereafter, the high-temperature, high-pressure liquid refrigerant may be discharged from the accumulator ACCU, introduced into the expansion valve EXV through the second channel 112, and changed in phase to a low-temperature, low-pressure liquid refrigerant by means of a throttling effect. Thereafter, the low-temperature, low-pressure liquid refrigerant may be discharged from the expansion valve EXV, introduced into the chiller (Chiller) through the third channel 113, and changed in phase to a low-temperature, low-pressure gaseous refrigerant by means of heat exchange. Thereafter, the low-temperature, low-pressure gaseous refrigerant may be discharged from the chiller (Chiller) and introduced into the accumulator ACCU through the fourth channel 114, such that the liquid refrigerant may be separated. Thereafter, the low-temperature, low-pressure gaseous refrigerant may be discharged to the outside from the accumulator ACCU. Thereafter, the low-temperature, low-pressure gaseous refrigerant discharged from the accumulator ACCU may be circulated through an outside cooling system, changed in phase to a high-temperature, high-pressure refrigerant, and introduced into the condenser COND again.

According to the integrated cooling module of the present invention, the constituent elements, which constitute the cooling system, are integrated by means of the central manifold to define the cooling circulation circuit. Therefore, hoses or pipes may be excluded by the integration of the components that constitute the cooling system, thereby achieving miniaturization and weight reduction of the entire cooling system. Further, mounting structures (brackets, bolts, nuts, etc.) for mounting the components in the vehicle may be eliminated, which may reduce the number of components and the number of assembling processes at the time of configuring the cooling system.

Further, although not illustrated separately, other cooling lines of the cooling system, for example, a channel, through which a coolant or third working fluid in a coolant line or a third working fluid line flows, may be additionally formed in the central manifold, and a plurality of lines of the cooling system may be integrated, thereby further maximizing spatial efficiency of the vehicle.

While the embodiments of the present invention have been described with reference to the accompanying drawings, those skilled in the art will understand that the present invention may be carried out in any other specific form without changing the technical spirit or an essential feature thereof. Therefore, it should be understood that the above-described embodiments are illustrative in all aspects and do not limit the present invention.

What it claimed is:

1. An integrated cooling module comprising:
   a central manifold having a mounting space in which components are mounted, a plurality of refrigerant flow channels in which a refrigerant flows, and communication holes for allowing the components and the refrigerant flow channels to communicate with one another; and
   the components mounted on the central manifold and configured to communicate with at least one of the plurality of refrigerant flow channels,
   wherein the central manifold defines a cooling circulation circuit by connecting the components,
   wherein an accumulator assembling structure is provided at one end of the central manifold based on a longitudinal direction, and an accumulator is provided at one end of the central manifold based on the longitudinal direction by the accumulator assembling structure,
   wherein the accumulator assembling structure is integrated with the central manifold,
   wherein a condenser is mounted at one side of an upper portion of the central manifold based on the longitudinal direction, an expansion valve is mounted at the other side of the upper portion of the central manifold, and a chiller is mounted on a lower portion of the central manifold,
   wherein the plurality of refrigerant flow channels comprises:
   a first channel configured to connect the condenser and the accumulator;
   a second channel configured to connect the accumulator and the expansion valve;
   a third channel configured to connect the expansion valve and the chiller; and
   a fourth channel configured to connect the chiller and the accumulator,
   wherein the first channel is connected to one side of an intermediate heat exchanger disposed inside the accumulator, and the second channel is connected to the other side of the intermediate heat exchanger.

2. The integrated cooling module of claim 1, wherein the plurality of refrigerant flow channels comprises refrigerant flow channels in which pressures of the refrigerant flowing therein are different.

3. The integrated cooling module of claim 2, wherein the refrigerant flow channels in which pressures of the refrigerant flowing therein are different are formed at different heights.

4. The integrated cooling module of claim 1, wherein the plurality of refrigerant flow channels comprises:
   one or more upper channels formed at an inner upper side of the central manifold; and
   one or more lower channels formed at an inner lower side of the central manifold and formed below the upper channel.

5. The integrated cooling module of claim 4, wherein pressure of the refrigerant flowing in the upper channel is higher than pressure of the refrigerant flowing in the lower channel.

6. The integrated cooling module of claim 4, wherein a temperature of the refrigerant flowing in the upper channel is higher than a temperature of the refrigerant flowing in the lower channel.

7. The integrated cooling module of claim 4, wherein the upper channel has a smaller internal cross-sectional area than the lower channel or a larger internal cross-sectional area than the lower channel.

8. The integrated cooling module of claim 1, wherein the accumulator assembling structure is formed in a hollow ring shape.

9. The integrated cooling module of claim 8, wherein the accumulator comprises an upper accumulator and a lower accumulator, the upper accumulator is provided on an upper portion of the accumulator assembling structure and tightly assembled with the accumulator assembling structure, and the lower accumulator is provided on a lower portion of the accumulator assembling structure and tightly assembled with the accumulator assembling structure.

10. The integrated cooling module of claim 1, wherein the first channel and the second channel are formed above the third channel and the fourth channel.

11. The integrated cooling module of claim 1, wherein the first channel and the second channel each have a smaller internal cross-sectional area than each of the third channel and the fourth channel.

12. The integrated cooling module of claim 1, wherein in the cooling circulation circuit, a high-temperature, high-pressure refrigerant is introduced into the condenser from the outside and discharged as a high-temperature, high-pressure liquid refrigerant, the high-temperature, high-pressure liquid refrigerant discharged from the condenser is introduced into the accumulator through the first channel and discharged again, the high-temperature, high-pressure liquid refrigerant discharged from the accumulator is introduced into the expansion valve through the second channel and discharged as a low-temperature, low-pressure liquid refrigerant, the low-temperature, low-pressure liquid refrigerant discharged from the expansion valve is introduced into the chiller through the third channel and discharged as a low-temperature, low-pressure gaseous refrigerant, the low-temperature, low-pressure gaseous refrigerant discharged from the chiller is introduced into the accumulator through the fourth channel and discharged again, and the low-temperature, low-pressure gaseous refrigerant discharged from the accumulator is discharged to the outside.

13. The integrated cooling module of claim 1, wherein one or more PT sensors connected to the refrigerant flow channel is provided on at least one of front and rear surfaces of the central manifold.

14. The integrated cooling module of claim 1, wherein the central manifold has mounting bosses provided in at least some of the communication holes, and the mounting bosses extend and protrude to the outside from at least some of the communication holes.

15. The integrated cooling module of claim 1, wherein the central manifold is formed in a long plate shape having a predetermined thickness.

* * * * *